Inventor
Albert B. Mojonnier
By McCanna, Morsbach & Pillote
Atty's

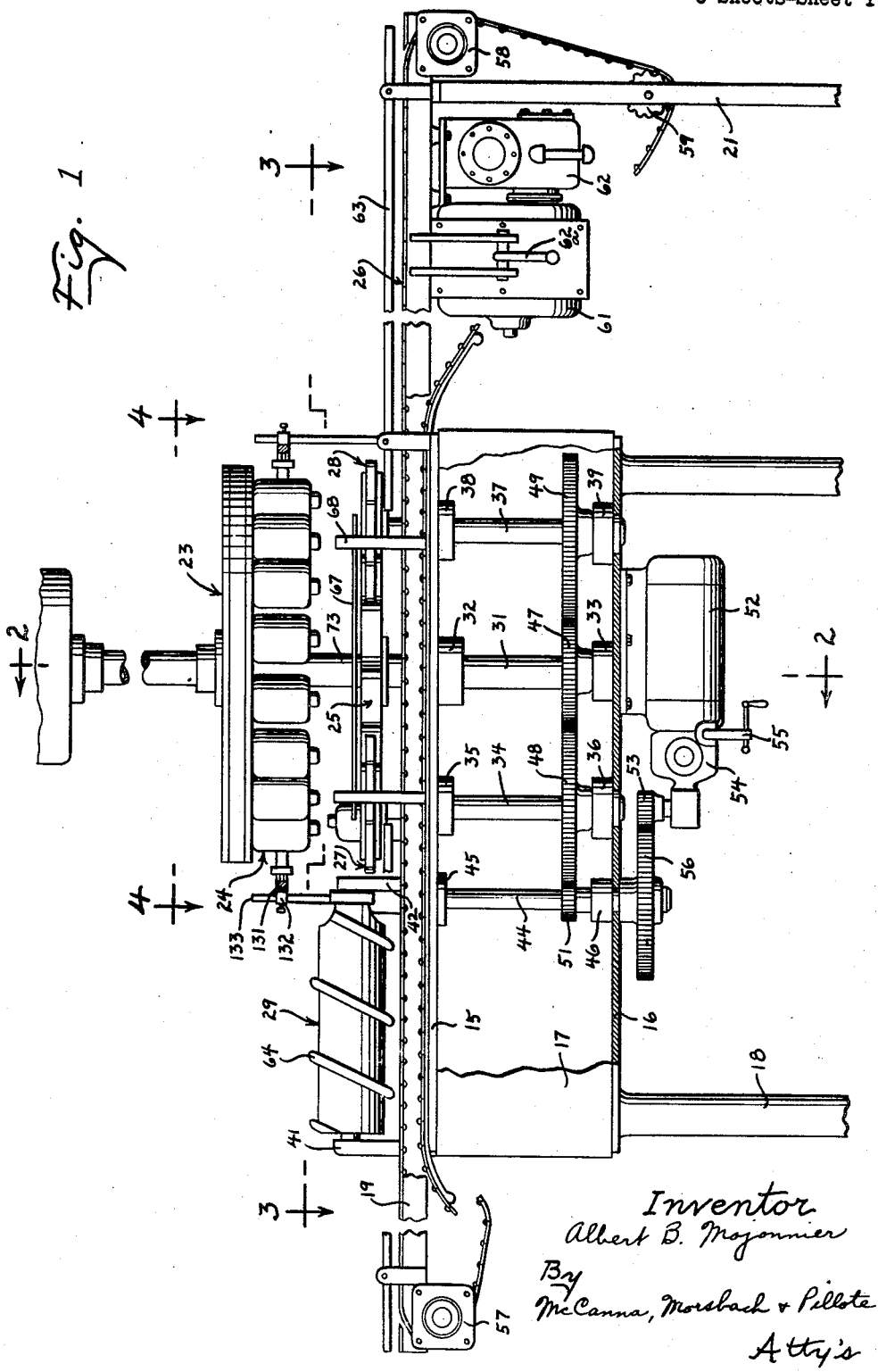

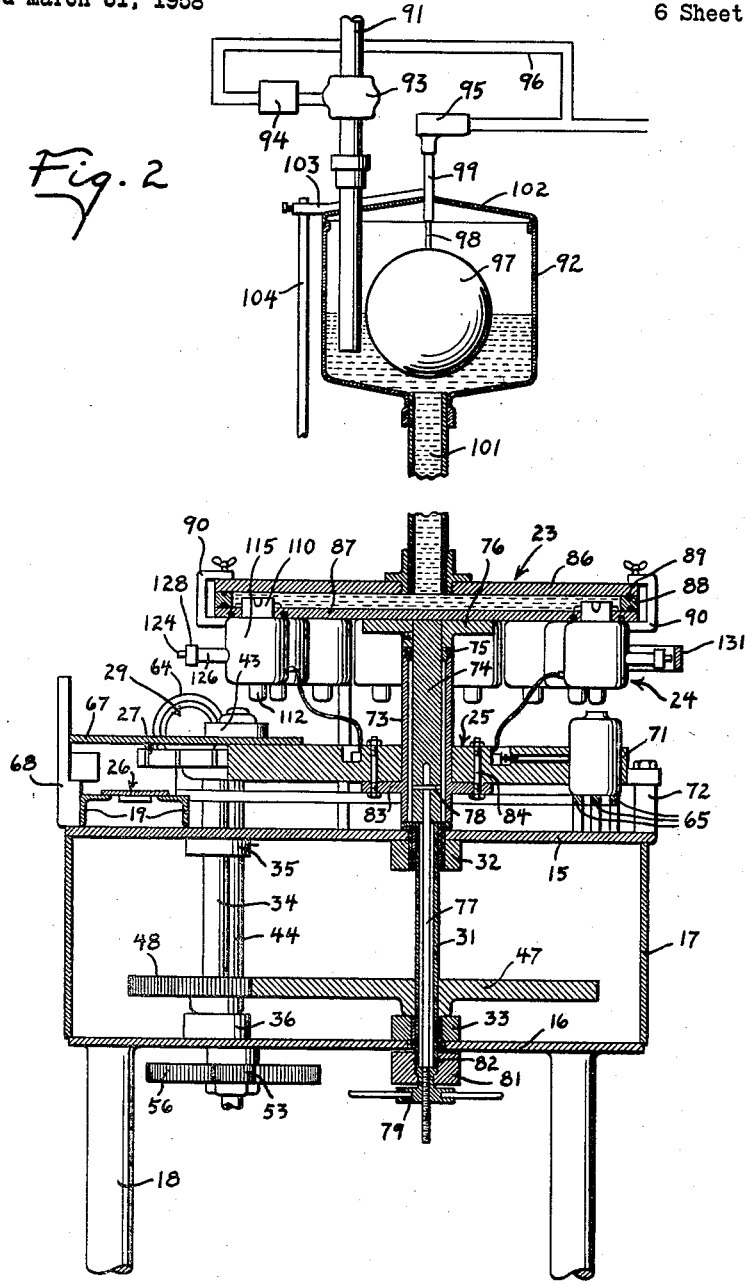

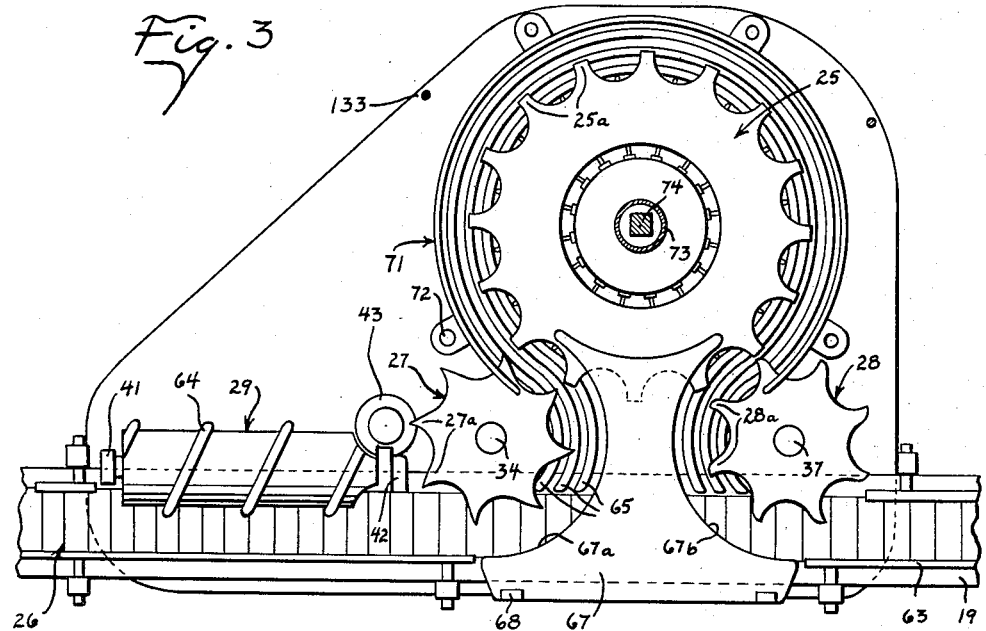
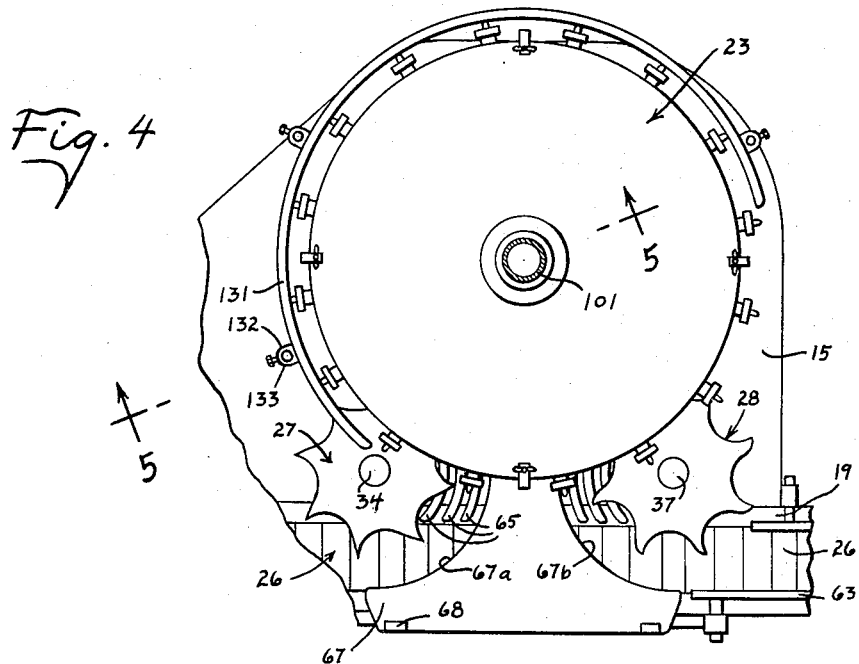

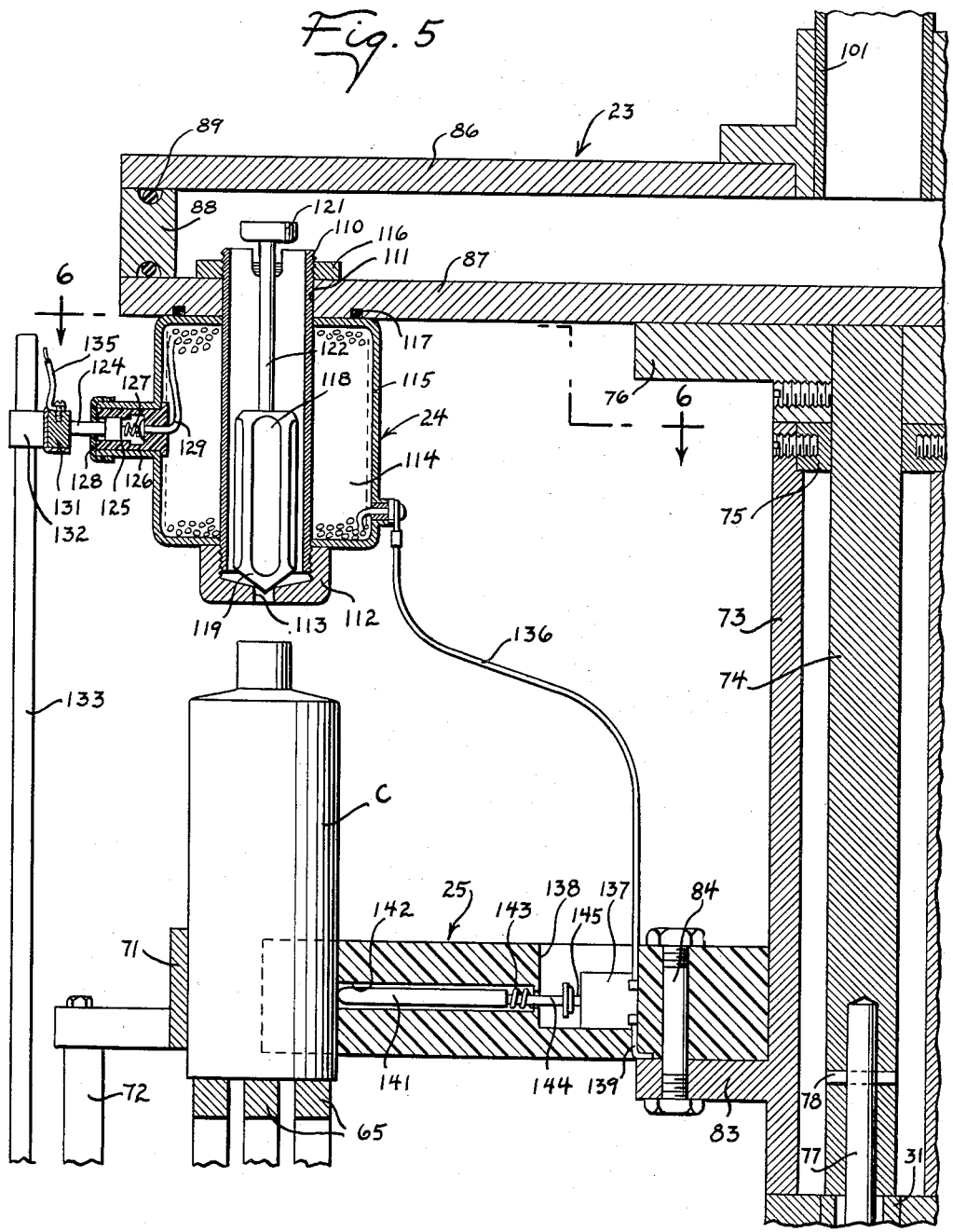

Aug. 23, 1960
A. B. MOJONNIER
2,949,941
ROTARY FILLING MACHINE
Filed March 31, 1958
6 Sheets-Sheet 6
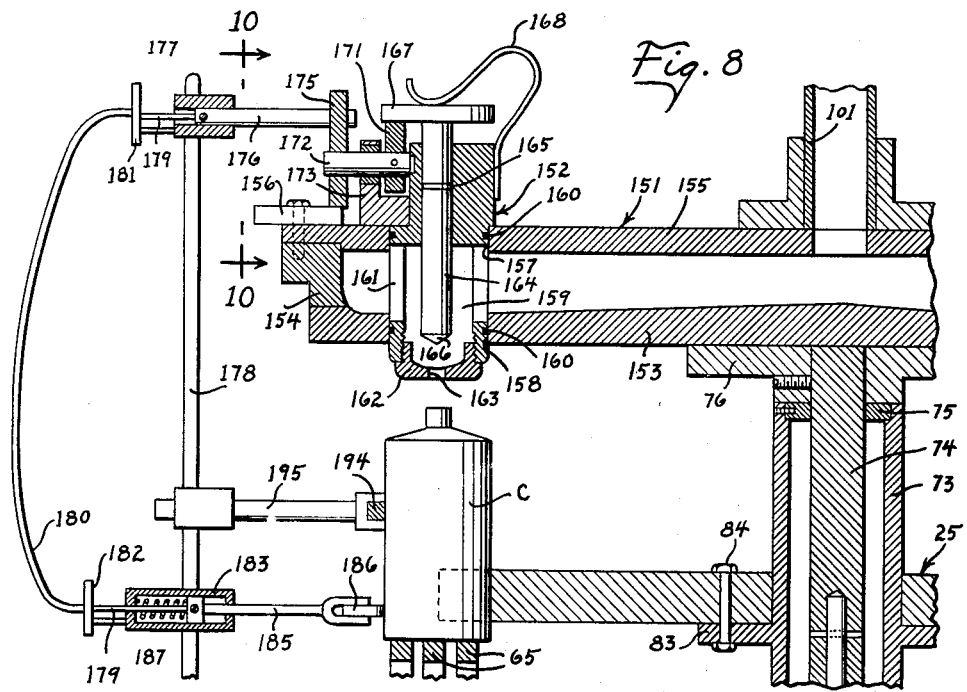
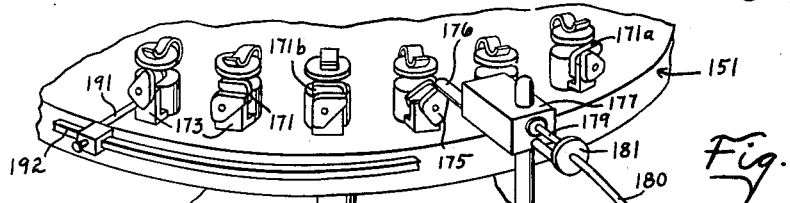
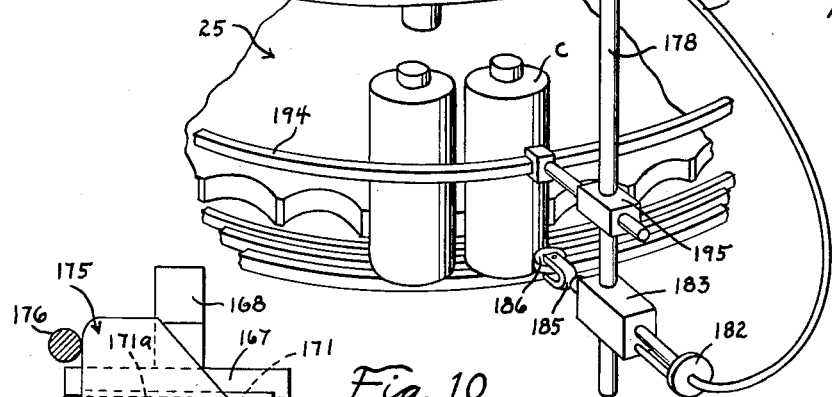
Inventor
Albert B. Mojonnier
By
McCanna, Morsbach & Pillote
Atty's

United States Patent Office 2,949,941
Patented Aug. 23, 1960

2,949,941

ROTARY FILLING MACHINE

Albert B. Mojonnier, Chicago, Ill., assignor to The Kartridg Pak Co., a corporation of Iowa Filed Mar. 31, 1958, Ser. No. 724,938

9 Claims. (Cl. 141—141)

This invention relates to a machine for dispensing measured quantities of liquids and particularly to a rotary dispensing machine.

An important object of this invention is to provide a machine for rapidly and accurately dispensing measured quantities of liquids into containers.

Another object of this invention is to provide a machine for dispensing liquids into containers in which the quantity of liquid dispensed into the containers can be readily varied even while the machine is in operation.

A more particular object of this invention is to provide a rotary filling machine having a plurality of independently operable dispensing valves to which liquid is supplied under a substantially constant head to provide a uniform rate of flow through the valves, when the latter are open, and which machine has a novel arrangement for opening the valves for a preselceted selectively variable time interval without necessitating the use of a special timer.

Another object of this invention is to provide a rotary filling machine in accordance with the foregoing object in which the valves are mounted on a rotary filler head and operated to their open position as the valves move through a preselected portion of each revolution of the head and provision is made for varying the rate of rotation of the head to thereby selectively vary the time interval during which the valves are open and to simultaneously vary the rate at which the containers are passed through the filling mahine.

A still further object of this invention is to provide a rotary filling machine in accordance with the foregoing objects and having an improved arrangement for preventing operation of any preselected valve in the absence of a container in filling position therebelow.

Yet another object of this invention is to provide a rotary filling machine which is of simple and economical construction; which can be used to dispense liquid of widely varying viscosity; and which is adapted for filling of containers of widely different sizes and with widely varying amounts of liquids.

These, together with various ancillary objects and advantages of this invention will be more readily appreciated as the same becomes better understood by reference to the following detailed description when taken in connection with the accompanying drawings wherein:

Figure 1 is a fragmentary front elevational view of the filling machine, with parts broken away and shown in section to illustrate details of construction;

Fig. 2 is a transverse vertical sectional view through the filling machine taken on the plane 2—2 of Figure 1;

Fig. 3 is a horizontal sectional view through the filling machine, taken on the plane 3—3 of Figure 1;

Fig. 4 is a fragmentary horizontal sectional view through the filling machine, taken on the plane 4—4 of Figure 1;

Fig. 5 is an enlarged fragmentary vertical sectional view, taken on the plane 5—5 of Fig. 4;

Fig. 8 is an enlarged fragmentary vertical section through the filling machine of Fig. 7, and taken on the plane 8—8 of Fig. 7;

Fig. 9 is a fragmentary perspective view of the filling machine illustrating the valve operating mechanism therefor, and Fig. 10 is an enlarged fragmentary sectional view taken on the plane 10—10 of Fig. 8.

Figure 6:
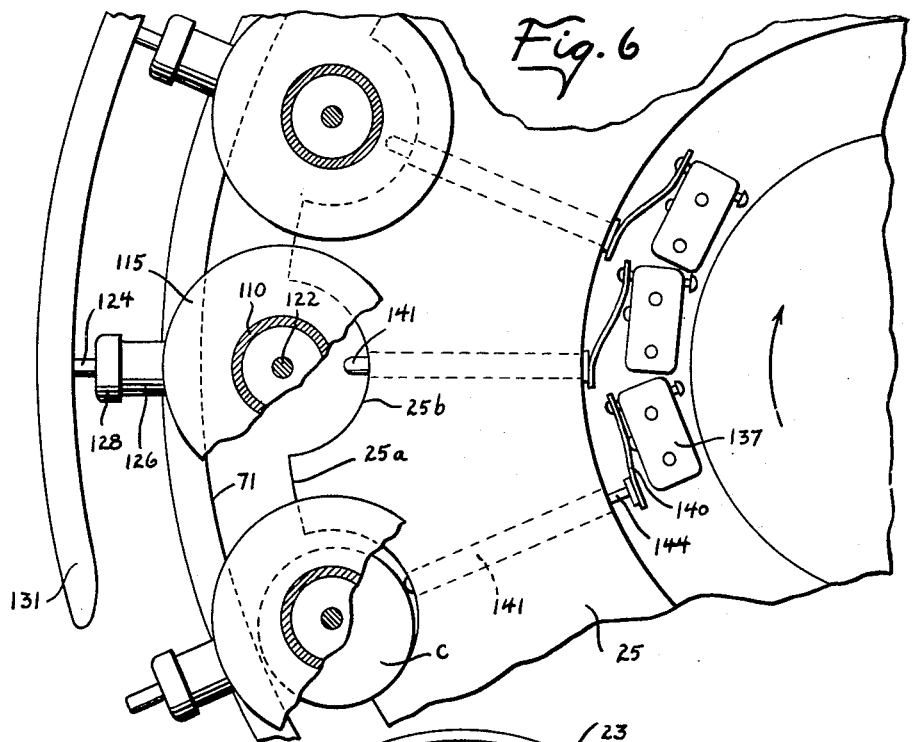
Fig. 6 is an enlarged fragmentary horizontal sectional view taken on the plane 6—6 of Fig. 5.

Reference is now made more specifically to Figs. 1–6 of the accompanying drawings. The dispensing machine includes a base having top and bottom walls 15 and 16 and a perimetric side wall 17 extending therearound and defining an enclosure for the drive gears. The base is supported on legs 18 in spaced relation to the floor and a conveyor guide track 19, herein shown in the form of opposed angle iron rails is mounted on the top wall of the base and projects from opposite ends thereof. A conveyor track support leg 21 is provided on the outwardly extending end of the conveyor guide track 19, as is clearly shown in Figure 1.

The dispensing machine includes a rotary dispensing head 23 carrying a plurality of individual valve members 24 and a star wheel 25 disposed below the head 23 and movable therewith for advancing the containers in unison with the valves, as the head is rotated. An elongated conveyor 26 is mounted on the conveyer guide rails 19 for advancing containers to and from the star wheel 25. Auxiliary feed wheels 27 and 28 are provided and arranged to respectively remove the containers from the conveyer 26 to feed the same to the star wheel 25 and to remove the containers from the star wheel and return the same to the conveyor 26 after the completion of the filling operation. A feed screw 29 is driven in timed relation with the star wheel and with the feed wheels 27 and 28 and is arranged to control the rate of advance of the containers along the conveyer 26.

The head 23, conveyer 25, feed wheels 27 and 28 and feed worm 29 are driven in timed relation through a drive mechanism located within the base. In particular, the annular head 23 and star wheel 25 are supported on a shaft 31 (see Figs. 1 and 2) which is journaled by bearings 32 and 33 in the top and bottom walls 15 and 16 of the base. The feed wheel 27 is attached to a shaft 34 journaled in bearings 35 and 36 and the feed wheel 28 is mounted on a shaft 37 which is journaled in bearings 38 and 39 on the top and bottom walls of the base. The feed screw 29 is journaled in bearing blocks 41 and 42 on the top of the base and is driven through a worm drive 43 (see Fig. 3) carried by a shaft 44. As shown in Figure 1, the shaft 44 is also journaled, as by bearings 45 and 46, in the top and bottom walls of the base. An enlarged gear 47 is secured to the shaft 31 and meshes with gears 48 and 49 on the shafts 34 and 37 respectively. The gear 48 meshes with a gear 51 on the shaft 44 so that all instrumentalities will be operated in timed relation with each other. A motor 52 is affixed to the underside of the base and drives the power take-off gear 53 thereof through a continuously variable speed change mechanism 54 having a manually operable handle 55. The speed change mechanism may be of any conventional construction in which the speed of the power take-off gear 53 can be continuously adjusted over a wide range in respsonse to turning of the handle 55. The power take-off gear 53 meshes with a gear 56 on the lower end of the shaft 44 to thereby drive the head 23, the star wheel 25, the feed wheels 27 and 28 and the feed screw 29 at a selectively adjustable rate determined by the speed change mechanism 54.

The conveyer 26 is in the form of an articulated chain which is guidably supported on the rails 19 and entrained over an idler sprocket 57 adjacent one end of the guide rails and over a drive sprocket 58 adjacent the other end thereof. The return run of the conveyer 26 is looped over an idler sprocket 59 rotatably supported on the leg 21. A motor 61 is movably mounted on the conveyer guide rails 19 and is drivingly connected through a variable diameter pulley (not shown) to the speed-reducing mechanism 62. With this arrangement, the effective diameter of the pulley can be varied by turning the handle 62a which shifts the motor and drive belt and thereby effects adjustment of the conveyer speed so as to advance containers to the star wheel 25 at a rate approximately equal to the rate of filling of the containers. Guide bars 63 are mounted on the rails 19 and extend above the conveyer 26 to guide the containers therealong.

The feed worm 29 is disposed alongside the conveyer 26 and has a helical rig 64 thereon arranged to engage the containers as they are advanced by the conveyer 26. As is apparent, the feed worm will operate to properly space the containers and to also regulate the rate of advance thereof to the star wheel to a speed which is synchronized with the speed of rotation of the star wheel.

A container support platform, herein shown in the form of a plurality of spaced rails 65 (see Fig. 3) extends from a point alongside the conveyer 26 around the star wheel 25 and back to the conveyer 26 and a guide plate 67 extends crosswise of the conveyer for guiding the containers from the conveyer onto the support platform and from the support platform back onto the conveyer. The guide plate 67 is supported in spaced relation to the conveyer by posts 68 and has an arcuate guide edge 67a disposed concentric with the shaft 34 (see Fig. 3) arranged to engage the containers on the conveyer and guide the same onto the support platform. The teeth 27a of the star wheel 27 engage the containers as they move thereby and advance the same along the support platform to the star wheel 25. The other edge 67b of the guide plate is disposed concentric with the shaft 37 and guides the containers from the star wheel 25 back onto the conveyer 26, the teeth 28a of the feed wheel 28 being arranged to engage the containers as they leave the star wheel 25 to thereby advance the same onto the conveyer 26. An arcuate guide rail 71 is supported on posts 72 for retaining the containers in the pockets between the teeth 25a on the star wheel 25, as the latter is rotated.

Provision is made for elevating and lowering the head 23, to accommodate different sized containers, while maintaining a driving relation between the head and the star wheel 25. As best shown in Figs. 2 and 5, the shaft 31 is tubular and has an enlarged tubular extension 73 rigidly secured to the upper end thereof. A stub shaft 74 is slidably and non-rotatably supported in a guide-block 75 attached to the shaft extension and a flange 76 is affixed to the upper end of the stub shaft 74 for supporting the head 23. A rod 77 is attached to the lower end of the stub shaft 74, as by a pin 78 and a wheel 79 threadedly receives the lower end of the rod to effect elevating and lowering of the head in response to rotation of the wheel. As is shown in Fig. 2, the wheel is non-slidably and rotatably supported on a block 81, which block is rigidly secured to the lower end of the shaft 31, as by pins 82. A flange 83 is provided on the shaft extension 73, intermediate the ends thereof, and the star wheel 25 is secured to the flange by fasteners 84. As is apparent, the star wheel and head are rotated in unison with the shaft 71 and the head 23 can be selectively elevated and lowered with respect to the star wheel and container support platform 65, to accommodate different size containers.

The head 23 is circular in configuration and includes spaced top and bottom walls 86 and 87 and a peripheral rim 88 interposed between the top and bottom walls and sealed thereto as by gaskets 89 to define a flow chamber therebetween. C clamps 90 are provided for maintaining the top and bottom walls of the head 23 in assembled relation. The dispensing valves 24 are mounted on the head, in communication with the flow chamber therein, and are each disposed above a respective one of the pockets formed between the teeth 25a on the star wheel 25 to dispense liquid from the flow chamber into a container C therebelow, as it is advanced by the star wheel. In accordance with the present invention, provision is made for maintaining the liquid to be dispensed at a substantially constant "head" above the dispenser valves and for opening the dispenser valves through a preselected portion of each revolution of the head to thereby dispense a measured quantity through each valve dependent upon the head of the column of liquid, the rate of flow through the valve, and the time during which the valve is open.

The liquid is supplied to the filler head through a supply pipe 91 connected to a storage tank (not shown). The fluid from the pipe is discharged into a tank 92 under the control of a valve 93 and provision is made for regulating opening and closing of the valve 93 to maintain a substantially constant liquid level in the tank 92. In the specific embodiment illustrated, the valve 93 is operated by means of a solenoid 94 and a switch 95 is operatively connected through conductors 96 to the solenoid and to a source of power (not shown) for selectively energizing the same. A float 97 is disposed in the tank 92 and has a rod 98 thereon operable through a guide 99 to actuate the switch 95. The arrangement is such that the float operates the switch 95 and controls energization of the solenoid 94 to open the valve 93 when the liquid in the tank falls below a preselected level and to close the valve 93 when the liquid in the tank rises to the aforementioned preselected level. Obviously, different arrangements for maintaining a substantially constant liquid level in the tank could be provided without departing from the scope of the present invention.

The tank 92 is disposed axially of the head 23 and has a delivery pipe 101 thereon which communicates the tank with the head 23. Conveniently, the filler pipe 101 may also provide the sole support for the tank 92 so that the tank rotates with the head. The float and the supply pipe 91 are secured to the cover 102 of the tank, which cover is supported by means of an arm 103 and a post 104 independently of the tank.

The cover 102, and the float and supply pipe thus remain stationary while the tank 92 rotates relative thereto with the head 23. In practice, the speed of rotation of the head is not so high as to cause appreciable agitation of the liquid in the tank, as the latter is rotated. As is apparent, the length of the delivery pipe 101 can be selectively varied, and the cover 102 correspondingly adjusted along the post 104, to vary the "head" of liquid which is maintained above the dispenser valves 24. This enables the filler to dispense liquids of widely different viscosities, the relatively higher head being provided for the high viscosity liquids and a relatively lower head being provided for the low viscosity liquids.

The dispenser valves 24, illustrated in the embodiment of Figs. 1–6, are of the solenoid-operated type and provision is made for supplying energy to the solenoids of the individual valves as the latter are rotated through a portion of each revolution of the filler head 23. The valves, as illustrated in Fig. 5, each comprises a tube 110 which extends through an opening 111 in the bottom wall 87 of the filler head, in communication with the chamber therebetween, and which valve has a nozzle 112 threaded to the lower end thereof and defining an orifice 113. The solenoid coil 114 is disposed around the tube 110 and is enclosed in a casing 115. The entire dispenser and solenoid valve assembly is retained in position on the head by means of a nut 116 threaded on the upper end of the tube, and a gasket 117 is interposed between the casing 115 and the bottom wall of the head to seal the interface therebetween.

A valve member is provided for controlling the flow through the orifice and is herein shown in the form of an elongated fluted body 118 which is slidably disposed in the tube 110 and formed with a valve face 119 on the lower end thereof cooperable with the orifice 113 to block flow therethrough when the valve is in its lowered position. The valve member is formed of a ferro-magnetic material which is arranged to be elevated when the solenoid 114 is energized, and a stop 121 is attached to the upper end of a rod 122 carried by the valve member and arranged to engage the top wall 86 of the filler head to limit opening movement of the valve. A brush formed of carbon or other electrically conductive material and designated 124 is slidably mounted in an insulated bushing 125 carried by a lateral sleeve 126 on the solenoid casing and is yieldably urged outwardly by means of a spring 127. A cap 128 is provided on the end of the sleeve 126 and the brush is electrically connected through the spring 127 to a conductor 129 leading to the solenoid coil. Energy is supplied to the solenoids of the several valves 24, as the latter move through a preselected portion of each revolution of the head, by means of an arcuate bar 131 formed of electrically conductive material and which is disposed in the path of movement of the brushes 124 to engage the latter as the head is rotated. As best shown in Fig. 4, the bar preferably extends throughout a substantial portion of each revolution so as to energize the solenoid valves and open the same as the latter are rotated through a major portion of each revolution of the head. The bar 131 is adjustably supported on brackets 132 on upright posts 133 to enable raising and lowering of the bar when the head 23 is elevated and lowered. Energy is supplied to the bar 131 through a conductor 135 which is connected to a source of power. Preferably, the power source is of relatively low voltage, such as 12 volts, to minimize the shock hazards.

An arrangement is provided for controlling energization of each of the solenoid valves 24, selectively in accordance with the presence or absence of a container "C" in filling position on the star wheel 25 therebelow. As best shown in Fig. 5, each of the solenoid coils 114 are electrically connected to ground through a conductor 136 and a switch 137. The star wheel 25 is preferably formed of non-conductive material such as plastic and has an annular recess 138 in the upper face thereof inwardly of its outer periphery. The switches 137, each individual to one of the pockets formed between the teeth 25a of the star wheel, are mounted in the recess 138 and are grounded to the machine frame through conductor 139. The switches 137 are normally open and provision is made for closing the switch when a container "C" is positioned in the respective pocket, to thereby establish a ground connection for the conductor 136 and enable energization of the respective solenoid when the brush thereon engages the conductor bar 131. For this purpose, a rod 141 is slidably supported in a radially extending bore 142 and is yieldably urged outwardly to project into the pocket between the adjacent teeth in the star wheel by a spring 143. The rod has a switch operating finger 144 thereon which is arranged to engage the switch actuator 145 whenever a container is positioned in the respective pocket. With this arrangement, it is apparent that the ground connection for the solenoid will be established only when a container "C" is in dispensing position therebelow and that, in the absence of a container therebelow, the solenoid will not be energized when the respective brush 124 thereof engages the contact bar 131.

As is apparent, the amount of liquid dispensed during each revolution can be varied by controlling the length of the contact bar 131 so as to vary the portion of each revolution during which the valves are open. It is preferable, however, to arrange the contact bar 131 to engage the brushes and open the valves during a major portion of each revolution and to vary the speed of rotation of the head 23, as by the speed change mechanism 54, in order to vary the quantity of material dispensed into the containers.

Figure 7:
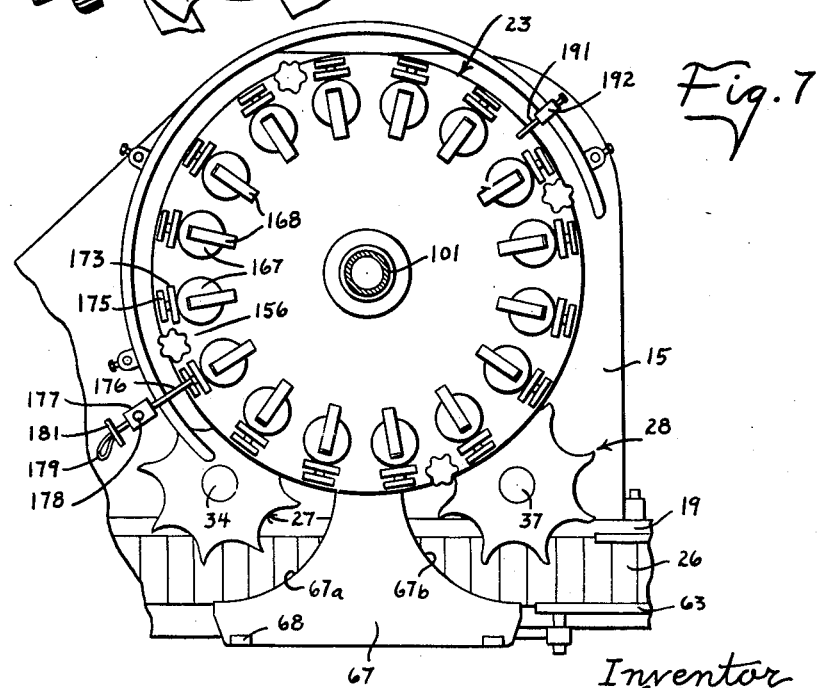
Fig. 7 is fragmentary horizontal sectional view through a filling machine having a modified filler head and valve arrangement.

The filling machine illustrated in Figs. 7-10 is similar to that illustrated in Figs. 1-6 and like numerals are used to designate corresponding parts therein. The embodiment of Figs. 7-10, however, includes a modified filler head 151 having a different form of dispenser valve 152 thereon and a different apparatus for operating the dispenser valves. In particular, the filler head 151 includes a bottom wall 153 having an upstanding rim 154 on the outer edge thereof and a top wall 155 which is secured to the rim by fasteners 156 to define a flow chamber between the top and bottom walls. The top and bottom walls have aligned openings 157 and 158 therein and the cylindrical body 159 of the valve member extends through the opening and is sealed to the top and bottom walls by O-rings 160. The valve body 159 has opening 161 therein, intermediate the top and bottom walls to permit fluid to flow from the chamber into the valve body and a nozzle 162 is threaded into the lower end of the valve body and has an orifice 163 therein. The valve member 164 is slidably supported in the top wall of the valve body and sealed thereto by a gasket 165. A valve face 166 is provided on the lower end of the valve member and is cooperable with the nozzle 162 to control the flow through the orifice 163

An enlarged head 167 is provided on the upper end of the valve member and a leaf spring 168 is secured to the valve body and engages the head 167 to yieldably urge the valve member to its closed position. An apparatus is provided for opening each of the valve members as they are advanced by the head to a preselected angular position, if a container "C" is in dispensing position below each of the respective valves, and for thereafter closing the valves. In the specific apparatus illustrated, a valve opening cam 171 is mounted on a pin 172 for rotation about an axis perpendicular to the path of movement of the valves 152. The pin 172 is rotatably supported in a block 173 attached to the valve member and removable therewith. As is apparent from Figs. 9 and 10, the valve operating cam 171 has a first dwell portion 171a and a second dwell portion 171b disposed approximately at right angles to the dwell portion 171a. The dwell portion 171a is spaced relatively closer to the pin 172 than the dwell portion 171b and when the dwell portion 171a is up, as shown in Fig. 10, the spring 168 is operative to move the head 167 and valve member 164 downwardly to seat the latter and block flow through the orifice 163. When the valve operating cam 171 is moved in a clockwise direction from the position shown in Fig. 10, the dwell portion 171b is moved to the top thereby raising the head 167 and valve member 164 to open the latter. The cam 171 also has nose portions 171c and 171d arranged to engage the block 173 to respectively limit clockwise and counterclockwise movement of the valve operating cam, as viewed in Fig. 10.

An actuator cam 175 is attached to each of the pins 172 and an operating finger 176 is slidably mounted on a bracket 177 for movement into and out of the path of the actuator cams 175, as the latter are rotated by the filler head 151. The bracket 177 is mounted on a post 178 for vertical adjustment with respect to the base of the machine, and a Bowden wire 179 is operatively connected to the finger 176 for reciprocating the same. The housing 180 of the Bowden wire is anchored by a fitting 181 to the bracket 177. The other end of the Bowden wire housing 180 is anchored by a fitting 182 to a bracket 183 also supported on the post 178. The Bowden wire 179 is operatively connected to a follower 185 which is slidably supported in the bracket 183 for movement radially of the star wheel 25 and a roller 186 is preferably provided on the inner end of the follower to engage the containers "C" as they are advanced by the star wheel. The follower 185 is yieldably urged inwardly by a spring 187 so that, in the absence of a container in any preselected pocket in the star wheel, the follower 185 will move inwardly and thereby retract the finger 176 out of the path of movement of the actuator cams 175. If a container is in position in the pocket in the star wheel, the follower 185 is moved outwardly and the finger 176 extended into the path of movement of the actuator cams. Necessarily, the roller 186 on the follower is angularly advanced slightly with respect to the finger 176 so as to engage the containers "C" in the pockets on the star wheel and extend or retract the finger 176 before a respective one of the cams 175 engages the same.

If a container is in filling position below the valve as it approaches the finger 176, the finger is extended into the path of movement of the respective actuator cam 175 at a level above the axis of the pin 172, as shown in Figs. 9 and 10, to thereby move the cam in a clockwise direction as viewed in Fig. 10 and open the valve member 164. The valve operating cam 171 maintains the valve member in its open position until the actuator cam 175 engages a second finger 191 at a point angularly spaced around the filler head from the finger 176. The finger 191 engages the actuator cam 175 at a point below the axis of the pin 172 to thereby move the actuator cam in a counterclockwise direction and return the valve operating cam 171 to the position shown in Fig. 10. This effects closing of the valve member 164 under the bias of spring 168.

Advantageously, the second finger 171 is mounted on a rail 192 which extends at least partway around the periphery of the filler head 23, the finger 191 being adjustable along the rail 192 to thereby permit selective control of the portion of each revolution during which the valve members are open. Conveniently, a guide rail 194 for retaining the containers "C" in position on the star wheel, is also mounted on the post 178, as by a bracket 195.

From the foregoing it is apparent that the filling machine illustrated in Figs. 7–10 is also arranged to effect dispensing of a liquid under a preselected head for a selectively variable time interval determined by the portion of each revolution during which the valve member is open and the rate of rotation of the filler head 151. In addition, the valve is operated in accordance with the presence or absence of a container in the star wheel therebelow so as to provide a no-can no-fill arrangement. With the fillers of the present invention, the containers can be filled at a relatively high rate of speed since the filler is arranged to dispense liquid into a plurality of the containers simultaneously and while they are being advanced through the machine. Moreover, the present machine provides a relatively accurate fill by reason of the controlled head and the controlled time during which the respective valves are opened.

I claim:

1. A rotary filling machine comprising an annular filler head mounted for rotation about an upright axis, a plurality of solenoid-operated valves mounted on said head and annularly spaced therearound, a tank disposed above said head, means communicating said tank with each of said valves, means for supplying liquid to said tank, means for maintaining a substantially constant liquid level therein to provide a preselected liquid head above said valves, a star wheel disposed below said head for advancing the containers to be filled in synchronism with said valves, circuit means for energizing said solenoid-operated valves including brush means individual to each of said valves, an electrically-conductive bar extending partway around said head and in the path of movement of said brush means, and means for connecting said bar to a source of power to sequentially energize said solenoid-operated valves and open said valves as the respective brush means engage said bar.

2. The combination of claim 1 including switch means individual to each of said solenoid-operated valve means for controlling actuation thereof, and means on said star wheel operatively connected to each of said switch means for detecting the presence or absence of a container at each of the pockets in said star wheel and for actuating the respective switch means to prevent energization of the valve individual thereto in the absence of a container below the valve means.

3. A rotary filling machine comprising an annular filler head mounted for rotation about an upright axis, a plurality of solenoid-operated valves mounted on said head and annularly spaced therearound, means for supplying liquid to said valves, a star wheel disposed below said head and rotatable in unison therewith for advancing the containers to be filled, circuit means for energizing said solenoid-operated valves during a preselected portion of each revolution, said circuit means including an electrical contact on each of said solenoid valves, an electrically-conductive bar extending partway around said filler head in the path of movement of said contacts, switch means on said star wheel individual to said valves, means for closing each of said switch means in response to the presence of a container in filling position on the star wheel, and means connecting each of said solenoid valves to a respective one of said switches.

4. A rotary filling machine comprising a filler head mounted for rotation about an upright axis, a plurality of dispenser valves mounted on said head and circumferentially spaced therearound, means for supplying fluid to each of said valves, said valves each including a valve member movable from a first position blocking flow through the valve to a second position opening the valve, a valve-operating cam mounted for oscillation about an axis extending radially of said head, a star wheel disposed below said head for advancing containers in unison with said valves, an actuating cam individual to each of said valve-operating cams for moving the same between said first and second positions, a finger mounted for movement into and out of the path of said actuating cams adapted upon engaging one of the actuating cams to move the respective valve-operating cam to said second position and open the respective valve, means responsive to the presence of a container on the star wheel below each of the valves as they are advanced past said finger for extending the same into the path of said actuating cams, and means engageable with said actuating cams when the valves are advanced to a second position for moving said operating cams from the second position to the first position thereof.

5. The combination of claim 4 including means for maintaining the liquid to be dispensed at a substantially constant level above said valves.

6. A rotary filling machine comprising a filler head having spaced top and bottom walls defining a flow chamber therebetween, said top and bottom walls having a plurality of aligned openings therein at circumferentially spaced points around the head, a valve body extending through each pair of aligned openings and sealed to said top and bottom walls, said valves having a discharge orifice at the underside thereof communicating with said flow chamber, a valve member mounted in said body and extending above said head, means yieldably urging said valve members to a position blocking flow through said valves, a star wheel below said head for advancing containers in unison with said valves, valve-opening means individual to each valve engageable with the respective valve member for opening the same, a first finger engageable with said opening means for actuating the same to open the respective valves as the latter are advanced to a preselected angular position, and a second finger engageable with said valve-operating means for actuating the same to close the valves after they are advanced a preselected distance from said first position.

7. A rotary filling machine comprising a filler head having spaced top and bottom walls defining a flow chamber therebetween, said top and bottom walls having a plurality of aligned openings therein at circumferentially spaced points around the head, a valve body extending through each pair of aligned openings and sealed to said top and bottom walls, said valves having a discharge orifice at the underside thereof communicating with said flow chamber, a valve member mounted in said body and extending above said head, means yieldably urging said valve members to a position blocking flow through said valves, a star wheel below said head for advancing containers in unison with said valves, valve-opening means individual to each valve engageable with the respective valve member for opening the same, a first finger engageable with said opening means for actuating the same to open the respective valves as the latter are advanced to a preselected angular position, a second finger engageable with said valve-operating means for actuating the same to close the valves after they are advanced a preselected distance from said first position, a tank mounted on said head in communication therewith, and means for maintaining a preselected liquid level in said tank to provide a substantially constant head of liquid above said valves.

8. The combination of claim 7 including means responsive to the absence of a container on the star wheel below the respective valve when the valve reaches said first position for retracting said finger out of the path of said valve-operating means.

9. The combination of claim 8 wherein said valve-operating means includes a valve-operating cam mounted for oscillation about an axis extending radially of said head.

References Cited in the file of this patent
UNITED STATES PATENTS

| | | |
|---|---|---|
| 1,664,002 | Stone et al. | Mar. 27, 1928 |
| 1,850,200 | Cereghino | Mar. 22, 1932 |
| 2,377,796 | McKinnis | June 5, 1945 |
| 2,512,199 | Dawson | June 20, 1950 |
| 2,584,355 | Koegler | Feb. 5, 1952 |
| 2,761,605 | Pahll et al. | Sept. 4, 1956 |